April 17, 1962 C. N. REID 3,029,850
METHOD AND APPARATUS FOR PROCESSING EARS OF CORN
Filed July 7, 1959 4 Sheets-Sheet 1

INVENTOR:
CHARLES N. REID

BY Eaton, Bell, Hunt & Seltzer
ATTORNEYS

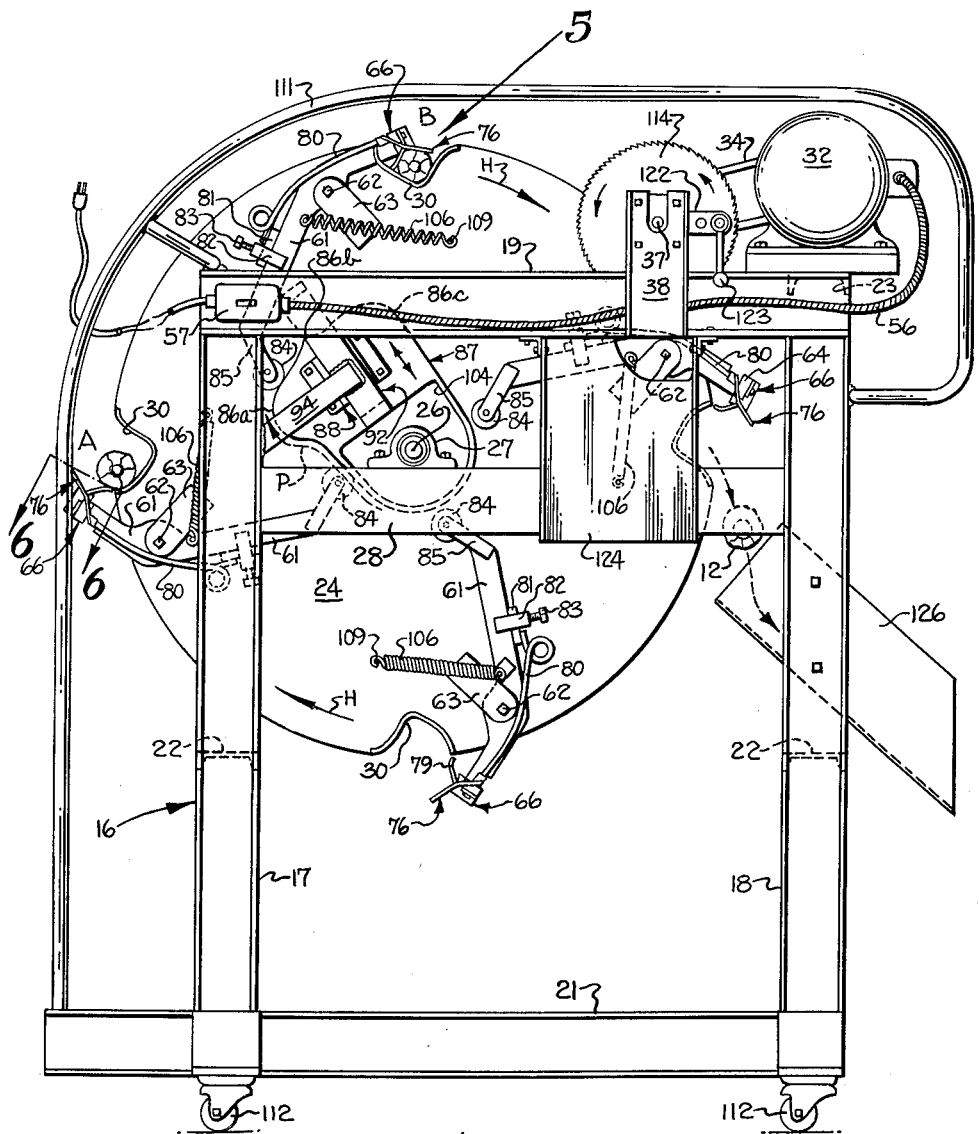

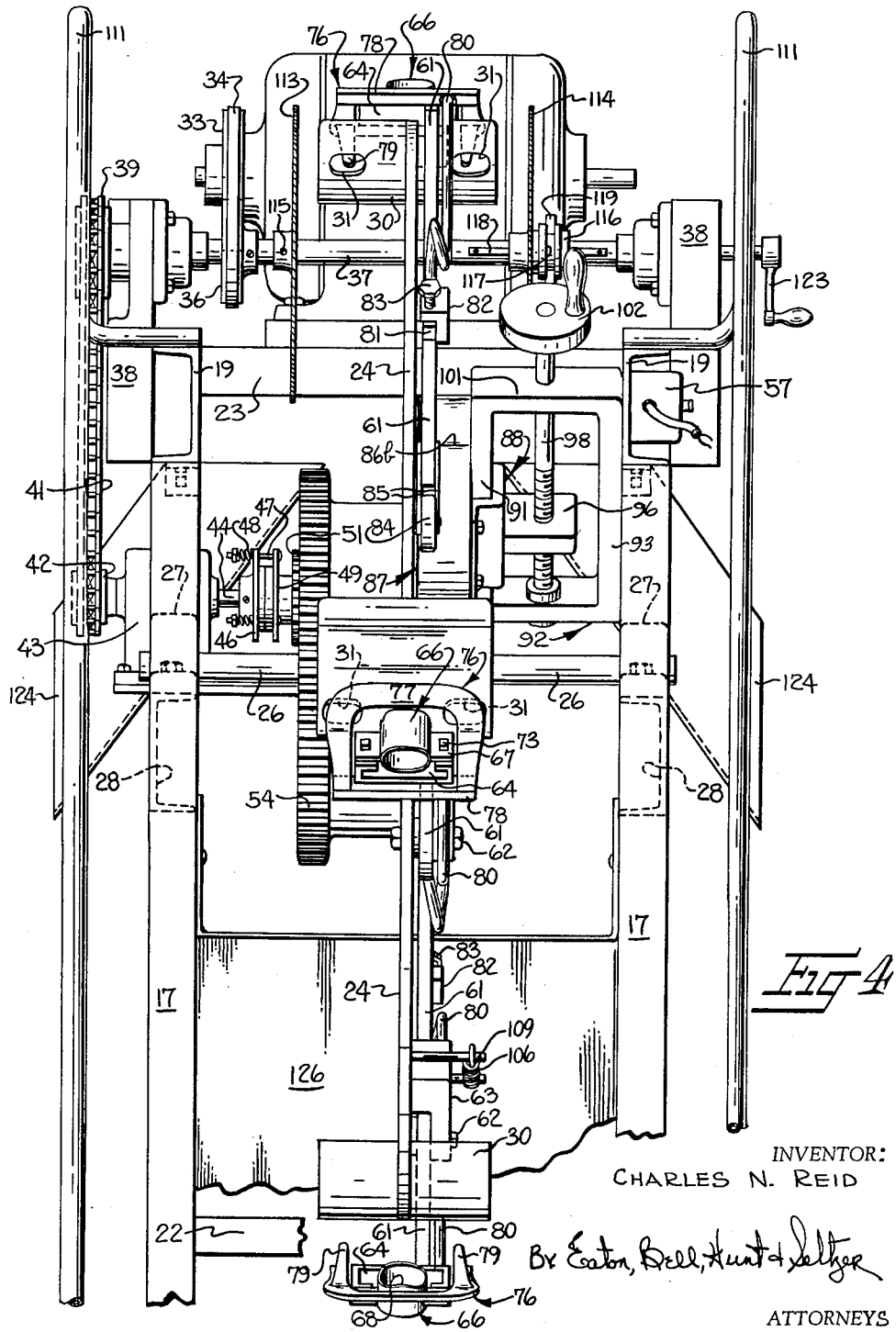

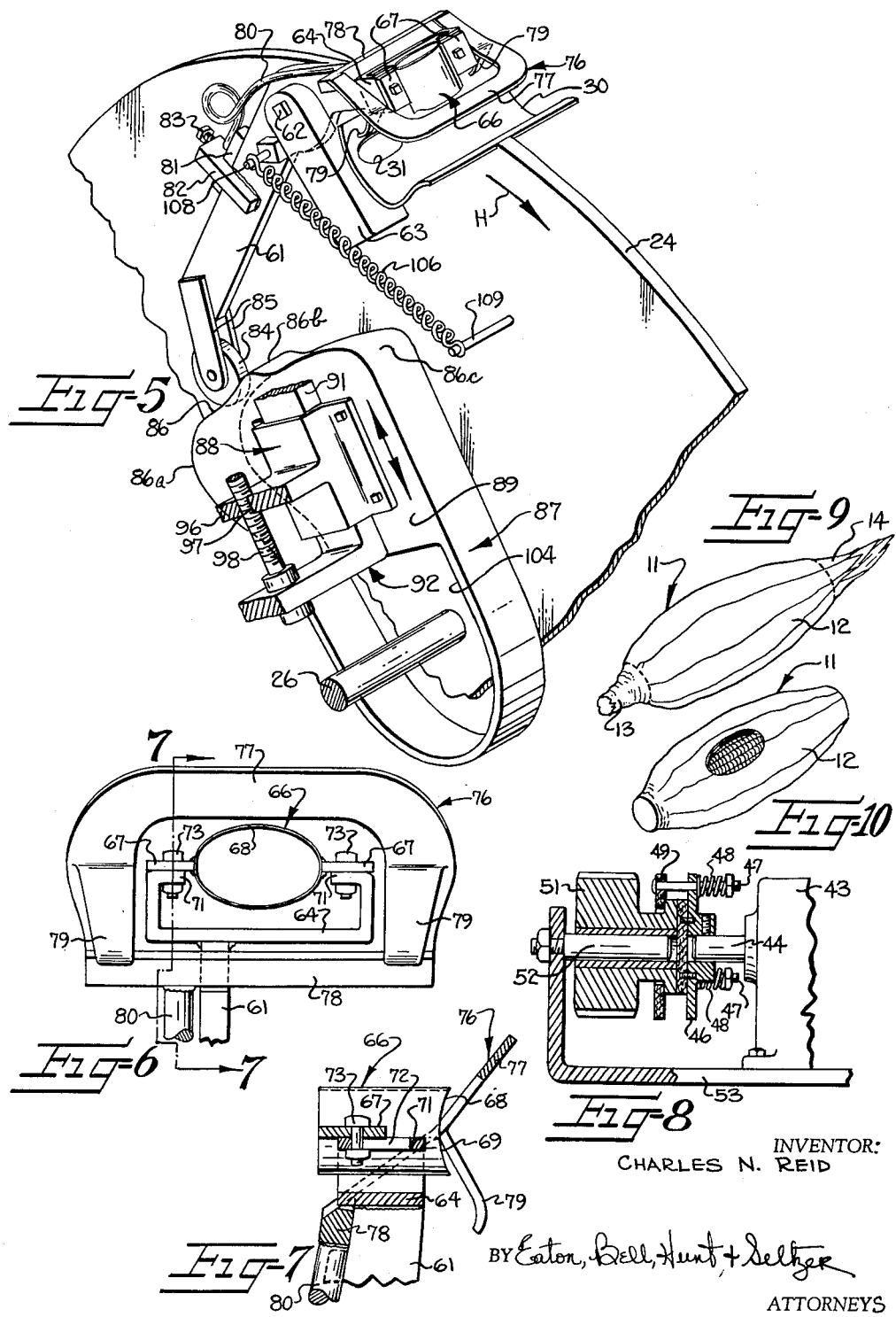

3,029,850
METHOD AND APPARATUS FOR PROCESSING EARS OF CORN

Charles N. Reid, 2500 Remount Circle, Charlotte, N.C.
Filed July 7, 1959, Ser. No. 825,455
20 Claims. (Cl. 146—81)

This invention relates to a method and apparatus for processing ears of corn and more particularly to such a method and apparatus for processing an ear of corn so as to remove undesirable end portions and display a portion of the kernels on the ear to a prospective purchaser.

A common item found in food markets today is corn in the form of what is generally referred to as an ear and which has been simply removed from its stalk and sold to customers in this natural form without further processing. As is well known, these ears of corn containing kernels disposed on a cob are encased in a relatively thick and tough husk and terminate at one end in a tassel and at the other end with a portion of the stalk by which the ear is attached to its plant. While such ears of corn are frequently sold in this natural form, the purchaser frequently desires to inspect the condition of the kernels for color, size, palatability, tenderness and the like and generally accomplishes this inspection by the rather inconvenient technique of attempting to tear an opening in the husk to expose the kernels therebeneath. In order to render this inspection of the kernels a more simple and quick undertaking, a common practice in markets has been to manually cut-away with a knife a portion of the husk to expose the kernels to view. As a result of the large quantity of such ears of corn which are sold daily, particularly in the larger markets, the task of manually cutting away portions of the husk becomes monumental and often prohibited as a result of the labor cost involved. Furthermore, a manual husk cutting operation is at best an awkward operation and frequently produces excessive damage to the kernels, ragged and unattractive edges of the husk, and on occasion exposes the individual performing the husk cutting operation to danger from accidental wounding with the knife.

Another operation frequently performed on ears of corn in markets is the removing of the end portions of the ear, namely the stalk portion at one end and the tassel portion at the other end which relieves the purchaser from performing this task at home and therefore adds to the marketability of such ears of corn. This cutting or trimmnig of the end portions of the ear also requires additional labor when done manually adding further to the cost from the standpoint of labor involved.

Accordingly, a primary object of the invention is to provide a new and novel method and apparatus for processing ears of corn.

Another object of this invention is to provide a new and novel method and apparatus for automatically removing a portion of the husk on an ear of corn so as to display the kernels therebeneath and to trim end portions from the ear to present an attractive marketable ear of corn which may be readily inspected in the market by a prospective purchaser.

A further object of this invention is to provide a new and novel apparatus for automatically processing ears of corn for market which permits such processing to be carried out efficiently and with such speed that large quantities of corn may be processed in a minimum of time and with a minimum of cost.

Still another object of this invention is to provide a new and novel apparatus for processing ears of corn which is simple in operation, which readily receives individual ears of corn fed therein for subsequent removal in a uniform manner of a portion of the husk and the end portions of each ear in a neat and attractive manner without substantial damage to the ear and which readily disposes of the waste portions of the ear which have been removed.

Briefly, the objects of the invention and other related objects are accomplished by feeding individual ears of corn into circumferentially spaced peripheral ear receiving work holders or pockets on a rotatable disc which advances the ears in an arcuate path. Each ear is clamped into its pocket by clamping means which are preferably cam actuated and when each ear reaches a predetermined location in said arcuate path, a husk cutting device is moved into cutting engagement with the husk of the ear preferably by a camming action so that a portion of the husk is cut-away to expose a number of the kernels on the ear. Each clamped ear is then moved between a pair of spaced trimming blades rotatably driven so that a terminal portion is removed from each end of each ear. The clamping means are then released to permit the ear to be discharged from its pocket.

Some of the objects of the invention having been stated, other objects will appear as the description proceeds when taken in connection with the accompanying drawings, in which—

FIGURE 3 is a fragmentary right elevational view of the other side of the apparatus of FIGURE 1;

FIGURE 4 is an enlarged fragmentary end elevational view looking from the right side and ingress end of the apparatus of FIGURE 1;

FIGURE 5 is an enlarged isometric detail looking in the direction of arrow 5 in FIGURE 3 and showing the clamping and husk cutting mechanism;

FIGURE 6 is an enlarged sectional view taken substantially along the line 6—6 of FIGURE 3 in the direction of the arrows;

FIGURE 7 is a sectional view taken substantially along line 7—7 of FIGURE 6 in the direction of the arrows;

FIGURE 8 is a sectional view taken substantially along line 8—8 of FIGURE 2 in the direction of the arrows;

FIGURE 9 is an isometric view of an ear of corn prior to the process in the apparatus of the invention; and FIGURE 10 is an isometric view similar to FIGURE 9 illustrating an ear of corn subsequent to processing in the apparatus of the invention.

Figure 1:
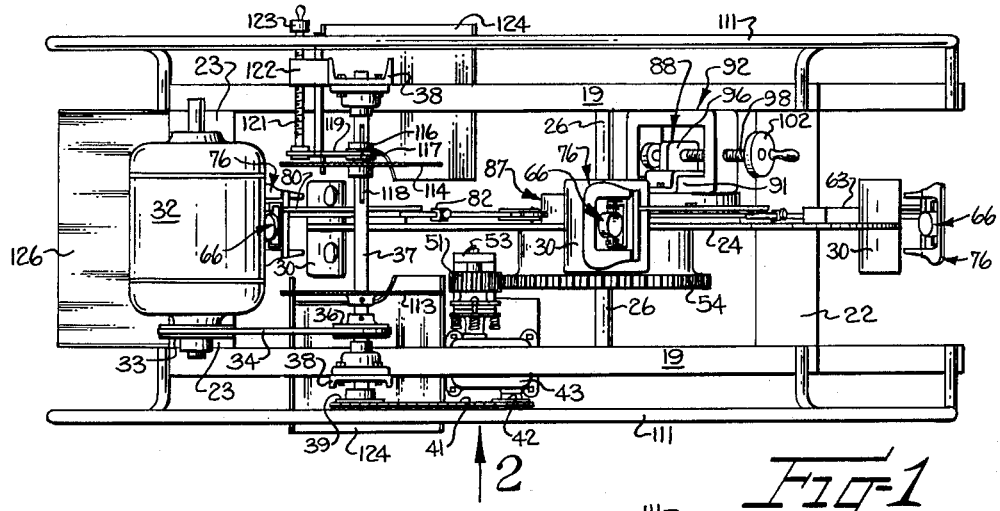
FIGURE 1 is a plan view of the ear processing apparatus of the invention.

Referring now to the drawings and to FIGURES 1 through 4 in particular, there is shown an apparatus for processing ears of corn which is constructed in accordance with the invention and by means of which the novel method of the invention may be practiced. In the apparatus of the invention, means have been provided for automatically cutting away a portion of the husk of an ear of corn and for removing terminal portions from each end of the ear. An ear of corn processed with the invention is designated by the numeral 11 in FIGURE 9 and is that type of ear commonly found in markets which is in substantially the form in which it appears after removal from its plant in the field. The ear 11 contains a husk 12 and terminates at one end in a stalk portion 13 and its tassel end 14.

Referring now again to FIGURES 1 through 4, the apparatus of the invention comprises a frame designated generally by the numeral 16 containing spaced vertical frame members 17, 18 as shown in FIGURE 3 having top and bottom horizontal frame members 19, 21 suitably connected thereto. As shown in FIGURE 4, the frame includes cross members 22, 23 extending transversely of the frame.

Means have been provided for advancing individual ears of corn fed into the apparatus in an arcuate path so as to be processed therein in accordance with the novel method of the invention. More specifically, a movable support member such as a feed wheel or disc 24 shown best in FIGURES 2, 3 is mounted for rotation within the apparatus on a shaft 26 extending transversely of the frame 16 and supported at each end in bearing pedestals 27 mounted by any suitable means on intermediate side members 28 positioned between the vertical frame members 17, 18.

In order to support each ear of corn in a fixed position on the disc 24 for processing, ear receiving pockets 29 are formed in the periphery of the disc 24 and are circumferentially spaced around the periphery of the disc as shown. Although any number of such pockets 29 may be provided, preferably four (4) are shown in the illustrated embodiment arranged in uniformly spaced relationship.

In order to position each ear in a pocket 29 with the axis of the ear extending substantially perpendicular to the plane of the disc 24, each pocket 29 is provided with a trough member 30 suitably secured thereto which is formed so as to be generally V-shaped cross-sectionally to permit nesting of an ear 11 therein as shown best in FIGURE 5. Each of the trough members 30 is provided with a pair of spaced apertures 31 for a purpose to be explained hereafter.

Figure 2:
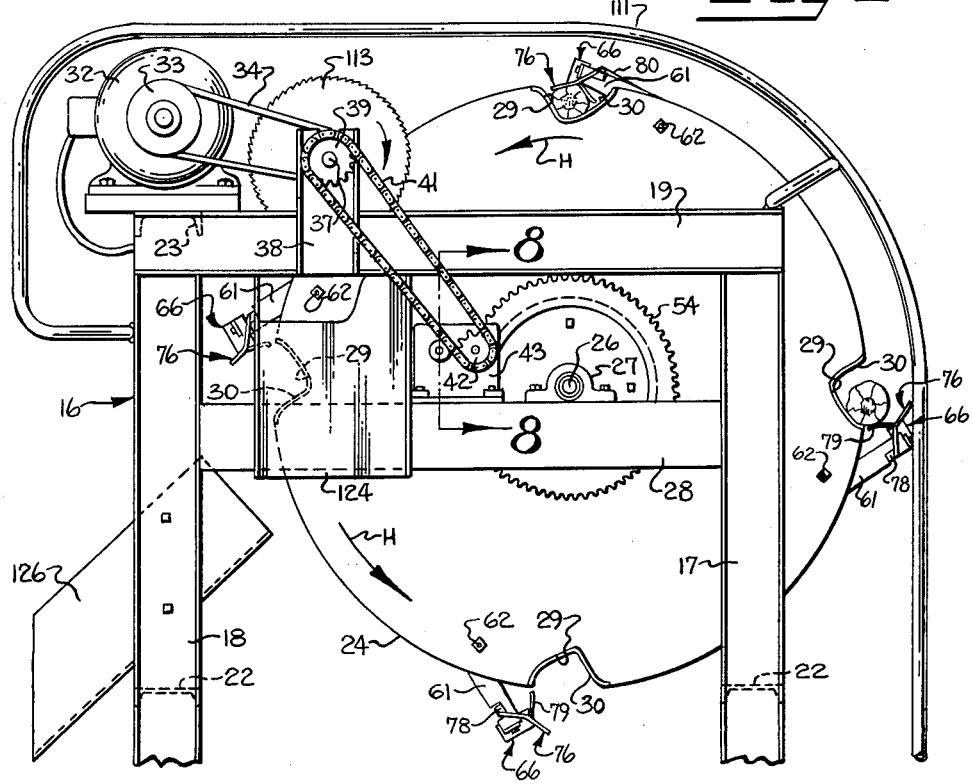
FIGURE 2 is a fragmentary left elevational view of the apparatus of FIGURE 1 looking in the direction of arrow 2.

Means are provided for driving the disc 24 in the direction of the arrows H in FIGURE 2. More specifically an electric motor 32 is suitably positioned on the upper frame members 19. The shaft of motor 32 is provided with a drive pulley 33 connected by means of a belt 34 to a driven pulley 36 fixedly mounted on a shaft 37 (FIGURE 4) rotatably positioned at each end in bearing brackets 38 secured on opposite sides of the apparatus to the frame members 19 as shown. The shaft 37 also contains a sprocket 39 connected by means of a chain 41 to a sprocket 42 on the input shaft of a speed reducer 43 mounted on the frame member 28.

The output shaft 44 of the speed reducer 43 is keyed to a clutch disc 46 (FIGURES 4, 8) provided with rods 47 having springs 48 associated therewith for yieldably urging a clutch disc 49 into driving engagement with a shoulder on a pinion 51. The pinion 51 is rotatably supported on a stub shaft 52 mounted at one end in a bracket 53 suitably secured to the frame 16. The pinion 51 is meshed with a large spur gear 54 suitably secured to the disc 24 for rotation therewith. This clutch disc arrangement is preferred as a safety feature to disengage the rotating disc 24 carrying the ears of corn and prevent injury to an operator who accidentally contacts the disc 24.

As shown in FIGURE 3, the motor 32 is provided with a power cable 56 connected to a switch 57 to permit the motor 32 to be energized from a suitable source of power.

Each of the pockets 29 has associated therewith ear clamping means and husk cutting means for processing ears of corn in accordance with the invention. More specifically, a crank arm 61 as shown in FIGURES 3, 5 is pivotally mounted at 62 on a bracket 63 suitably secured to the disc in any suitable manner. As shown best in FIGURE 6, each of the husk cutting means of the invention comprise a substantially U-shaped bracket 64 fixedly secured to the outer end of the crank arm 61 and arranged to support a tubular knife 66 preferably oval in cross-section and having a pair of laterally extending ears 67 suitably secured thereon and a sharpened edge 68 at one end. The bracket 64 contains inwardly directed flanges 71 having slots 72 formed therein for receiving bolts 73 extending through the ears 67 on the knife 66 to permit the knife to be adjustably positioned relative to the bracket 64.

As shown best in FIGURE 7, the sharpened edge 68 of the knife 66 is formed with arcuate side portions 69 so that the edge conforms generally with the circular cross-section of the ear 11.

The ear clamping means of the invention comprises a clamp designated generally by the numeral 76 having a substantially U-shaped portion 77 secured to a base member 78. A pair of downwardly extending ears 79 are also provided on the U-shaped portion 77 of the clamp 76 and define therewith a substantially V-shaped recess for engaging the outer periphery of an ear of corn 11. The base member 78 of the clamp 76 is fixedly secured by suitable means such as welding to a rod-like spring member 80 preferably formed of spring steel or the like. The spring member 80 is releasably secured at its end opposite from the clamp 76 to the crank arm 61 between a block 81 and a yoke 82 by means of an adjusting screw 83 to permit adjustment of the position of the clamp 76. The yoke 82 is fixedly secured to the crank arm 61.

The opposite end of the crank arm 61 is provided with a follower 84 rotatably mounted on spaced brackets 85 secured to the crank arm 61 in any suitable manner. The follower 84 is arranged to travel along the cam surface 86 on a slidable cam designated generally by the numeral 87. In order to support the cam 87 for sliding movement, a sleeve member broadly indicated by 88 is suitably secured to the side face 89 of the cam and receives a leg 91 of a fixed box-shaped supporting bracket designated generally by the numeral 92 (FIGURE 4). An opposite leg 93 of the bracket 92 is suitably secured by means such as welding to the frame member 19 and is securely held in a fixed position by a brace member 94 connecting the vertical frame member 17 as shown in FIGURE 3.

As shown best in FIGURE 4, the sleeve member 88 is provided with an extension 96 preferably formed integrally therewith which contains a central opening 97 threadedly engageable with a threaded shaft 98 extending through a bore 99 in a transverse portion 101 of the supporting bracket 92. The shaft 98 is provided with a handwheel 102 by means of which the shaft 98 may be manually rotated to slidably move the sleeve member 88 together with the cam 87 along the leg 91 of the fixed support bracket 92.

The cam 87 contains an opening 104 through which the shaft 26 of the disc 24 extends so that the cam 87 may be moved freely to any adjusted position within its range of movement. The cam follower 84 is urged against the cam surface 86 of the cam 87 by means of a spring 106 secured at one end to a post 108 on the crank arm 61 and at its other end to a post 109 on the disc 24.

In order to prevent injury during the operation of the apparatus of the invention, a guide rail 111 formed from a rod or the like and appropriately formed as shown best in FIGURE 3 is provided on each side of the apparatus. The guide rails 111 are suitably secured to the frame 16 by any suitable means such as welding or the like. If desired, the apparatus of the invention may be provided with casters 112 (FIGURE 3) to permit the apparatus to be readily moved.

Means are also provided in the apparatus of the invention for trimming the terminal end portions from each ear of corn. More specifically, a pair of circular saw-blades 113, 114 are positioned on the shaft 37 on opposite sides of the disc 24 as shown best in FIGURE 4. Blade 113 is fixedly secured by means such as a set screw 115 to the shaft 37 and blade 114 is secured to a slidable sleeve 116 containing a peripheral groove 117. The sleeve 116 is slidable along the shaft 37 and is guided during this sliding movement by means of a key 118 secured to the shaft.

The groove 117 is arranged to accommodate the bifurcated end of an arm 119, as shown best in FIGURE 1, movable transversely or the apparatus by means of a threaded rod 121 having one end secured to the arm 119. The rod 121 is threadedly engageable with a supporting block 122 and terminates at its end opposite from the arm 119 in a handwheel 123. The spacing between the blades 113, 114 may therefore be adjusted by rotation of the handwheel 123 which moves blade 114 relative to the fixed blade 113. Both of the blades are rotated simultaneously by the shaft 37 driven by the belt 34 from the motor 32.

In order to provide for the disposal of the terminal end portions 13, 14 on the ear 11, a trough 124 is suitably positioned on each side of the apparatus as shown in FIGURE 1 preferably secured to the frame member 19. The troughs 124 are preferably U-shaped in cross-section so that each severed end of the ear 11 drops downwardly and is guided laterally outward into suitable containers by means of the trough from the apparatus. A delivery chute 126 is also provided which is preferably U-shaped in cross-section and is fixedly secured to the vertical frame members 18 so as to receive the processed ears of corn 11 and guide them outwardly from one end of the machine into suitable containers.

Operation

In the operation of the apparatus of the invention which can be best understood by reference to FIGURE 3 in particular, the motor 32 is energized by means of the switch 57 to rotate disc 24 in the direction of the arrows H. The operator standing in front of the apparatus manually places an ear of corn 11 of the type shown in FIGURE 9 in the empty trough 30 as it becomes accessible in the manner shown. The ear of corn 11 is preferably inserted into the trough 30 when the trough is in the rotary position identified by the letter A in FIGURE 3.

In this position, the came follower 84 on the crank arm 61 traveling along the cam surface 86 has previously permitted the spring 106 to pivot the associated crank arm to the position shown for moving the clamp 76 and knife 66 in the position as shown to permit the ear 11 to be properly placed within the trough member 30.

As the disc 24 continues to rotate in the direction of the arrows H, the cam follower 84 traveling in the direction of the arrow P of FIGURE 3 on the cam surface 86 pivots the crank arm 61 in a clockwise direction upon the cam follower 84 reaching lobe portion 86a of cam 87 so that the clamp 76 is moved into engagement with the ear 11 and yieldably retains the ear 11 snugly within the bottom of the trough member 30. This clamping of the ear 11 is shown clearly at the position of the trough 30 identified by the letter B in FIGURE 3. It will be noted, as shown best in FIGURE 5, that clearance for the ears 79 on the clamp 76 is provided in the trough member 30 by means of the openings 31.

Continued rotation of the disc 24 and continued movement of the cam follower 84 onto cam surface portion 86b in the direction of the arrow P further pivots the crank arm 61 so that the cutting edge 68 of the knife 66 is moved downwardly until the cutting edge 68 engages the husk 12 on the clamped ear 11. The knife edge 68 cuts completely through the husk 12 so that a portion of the husk conforming to the over cross-sectional shape of the knife 66 is severed from the husk. In actual operation, the severed husk portion would be forced upwardly into the bore of the body of the knife 66 and be moved upwardly therein by subsequently severed husk portions until the husk portions are discharged from the opposite end of the knife 66 from the cutting edge 68. It should be understood that the depth of cut of the knife 66 is controlled by adjustment of the position of the cam 87 so as to prevent severe cutting of the kernels on the ear of corn 11.

Continued rotation of the disc 24 now moves the clamped ear 11 between the circular saw blades 113, 114 which have been suitably spaced so that as the clamped ear 11 moves therethrough, end portions 13, 14 are trimmed therefrom and a processed ear of corn of the type shown in FIGURE 10 results. The trimmed ends 13, 14 each drop laterally downward on opposite sides of the disc 24 to fall within troughs 124 and be guided downwardly into any suitable container or the like used to dispose of the trimmed end portions.

The continued rotation of the disc 24 now brings the ears of corn 11 adjacent the delivery chute 126 and the cam follower 84 traveling on cam surface portion 86c permits the crank arm 61 to be returned to its original position and the processed ear of corn 11 falls under the action of gravity downwardly into the chute 126 for subsequent disposal by means of a suitable container disposed therebeneath. It should be understood that as each empty pocket 29 arrives at the station A an ear of corn is fed by the operator into trough member 30.

In the drawings and specification there has been set forth a preferred embodiment of the invention and, although specific terms are employed, they are used in a generic and descriptive sense only and not for purposes of limitation, the scope of the invention being defined in the claims.

I claim:

1. A method of processing ears of corn with husks thereon comprising moving the ears of corn in a common predetermined path of travel, and cutting openings through the husks to expose the kernels of the corn whereby the corn can readily be inspected.

2. A method in accordance with claim 1 including severing at least one end portion of the ears of corn.

3. A method in accordance with claim 1 including simultaneously severing portions from both ends of the ears of corn.

4. A method of processing ears of corn with husks thereon comprising moving the ears of corn in a common predetermined path of travel, holding the ears of corn to prevent relative movement thereof while removing only a small portion of the husk of each ear to expose the kernels of the corn therebeneath and simultaneously severing portions from both ends of the ears of corn.

5. A method of processing ears of corn with husks thereon comprising successively clamping ears of corn in spaced apart relation, advancing the clamped spaced apart ears of corn in an arcuate path of travel while successively removing only a small portion of the husk of each ear to expose the kernels of corn therebeneath, successively releasing the processed ears and replacing them with ears to be processed.

6. A method in accordance with claim 5 wherein the removing of a small portion of the husk of each ear comprises cutting an opening through the husk, and severing at least one end portion of the ears of corn.

7. An apparatus for processing ears of corn with husks thereon comprising means for moving the ears of corn in a predetermined path of travel, and means operatively connected to said first recited means for cutting openings through the husks intermediate the ends of the ear to expose the kernels of the corn whereby the corn can readily be inspected.

8. In an apparatus according to claim 7 including means operatively connected to said first recited means and positioned in the path of travel of the ears of corn for removing at least one end portion of the ears of corn.

9. In an apparatus according to claim 8 including means operatively connected to said first recited means for simultaneously removing portions from both ends of the ears of corn.

10. An apparatus for processing ears of corn with husks thereon comprising the combination of means for moving the ears of corn in a predetermined path of travel, means operatively connected to said first recited means for holding the ears of corn to prevent relative movement thereof and means operatively connected to said holding means for removing only a small portion of the husk of each ear intermediate the ends thereof while being held to expose the kernels of corn therebeneath.

11. An apparatus for processing ears of corn with husks thereon comprising means for successively clamping the ears of corn in spaced apart relation, means operatively connected to said clamping means for advancing the clamped spaced apart ears of corn in an arcuate path of travel, means operatively connected to said advancing means for successively removing only a small portion of the husk of each ear while being advanced to expose the kernels of corn therebeneath and means operatively connected to said clamping means for successively unclamping and releasing the processed ears of corn.

12. An apparatus in accordance with claim 11 wherein said means for removing a small portion of the husk of each ear comprises a cutter for forming an opening through the husk, and means positioned in the path of travel of the ears of corn for severing at least one end portion of the ears of corn.

13. An apparatus for processing ears of corn with husks thereon comprising a rotatable member having a plurality of ear receiving pockets in the periphery thereof, means for driving said rotatable member, and cutting means operable in timed relation to said rotatable member for cutting openings through the husks intermediate the ends of the ears of corn being carried thereby to expose the kernels of corn therebeneath.

14. An apparatus for processing ears of corn with husks thereon comprising a frame, a rotatable member mounted on said frame and having a plurality of circumferentially spaced peripheral ear receiving pockets, clamping means carried by said rotatable member and associated with each of the pockets thereon for clamping an ear of corn positioned therein, husk cutting means carried by said rotatable member and being associated with each of the pockets thereon, and means for actuating said clamping means and said husk cutting means during rotative movement of said rotatable member.

15. An apparatus for processing ears of corn with husks thereon comprising a frame, rotatable means mounted in said frame and being provided with a plurality of ear receiving pockets, means for driving said rotatable means, clamping devices corresponding in number to the pockets on said rotatable means and being carried by said rotatable means for clamping the ears of corn when positioned in the pockets, husk cutting devices corresponding in number to the pockets on said rotatable means and being carried by said rotatable means, and cam means carried by said frame for actuating said clamping and husk cutting devices during rotation of said rotatable means.

16. In an apparatus in accordance with claim 15 wherein each of said husk cutting devices comprises a tubular knife.

17. In an apparatus in accordance with claim 15 including means for varying the cutting stroke of said cutting devices to permit various size ears to be properly processed.

18. In an apparatus in accordance with claim 15 including means positioned adjacent said rotatable means and being carried by said frame for severing at least one end portion of each ear of corn positioned in the pockets of said rotatable means.

19. In an apparatus in accordance with claim 15 including a pair of rotatable blades carried by said frame and straddling said rotatable means for cutting end portions from each ear of corn positioned in the pockets of said rotatable means.

20. In an apparatus in accordance with claim 19 including means for adjusting the spacing between said pair of rotatable blades whereby ears of corn of varying length may be properly processed.

References Cited in the file of this patent

UNITED STATES PATENTS

| | | |
|---|---|---|
| 2,056,556 | Bauer | Oct. 6, 1936 |
| 2,158,977 | Douthitt | May 16, 1939 |
| 2,494,914 | Urschel et al. | Jan. 17, 1950 |
| 2,679,099 | Harris | May 25, 1954 |